(No Model.)
H. ZITZEWITZ.
PULLEY HUB.
No. 302,218.      Patented July 15, 1884.
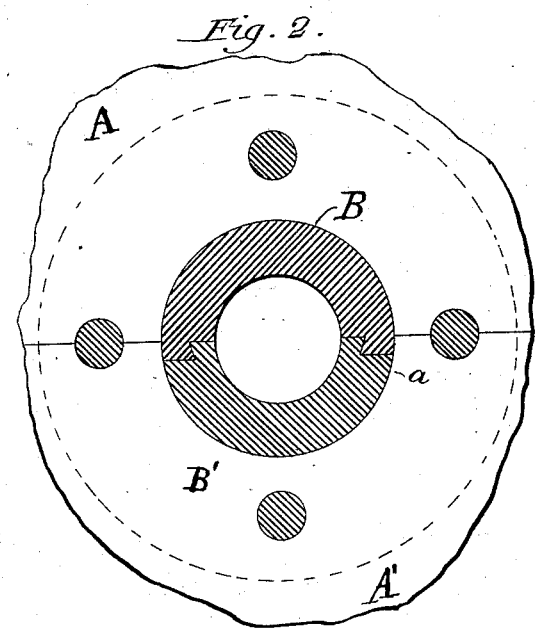
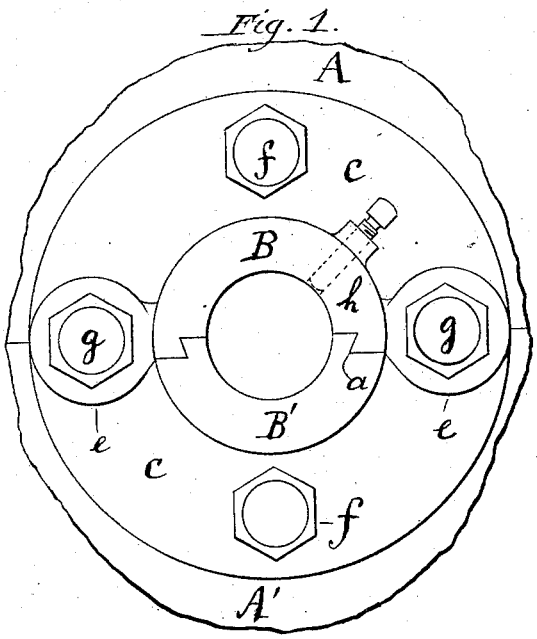
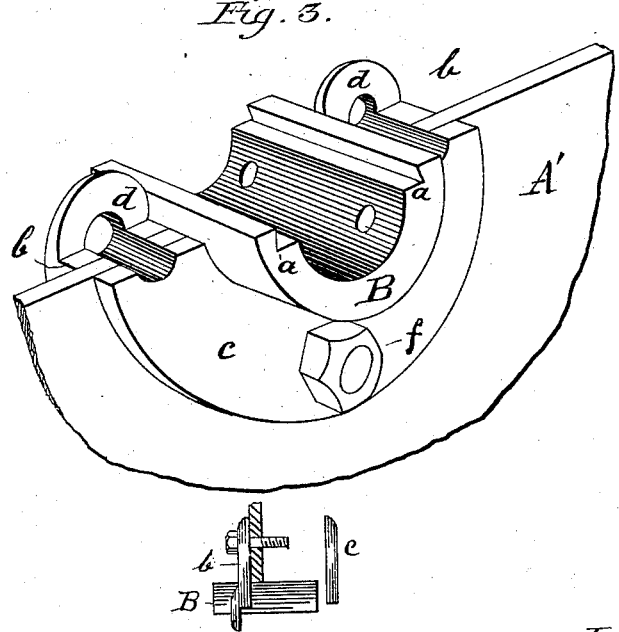
Witnesses:
Frank J. Blanchard
M. J. Clayton
Inventor:
Hermann Zitzewitz
By Wm. H. Lotz
Attorney.
N. PETERS. Photo-Lithographer, Washington, D.C.

UNITED STATES PATENT OFFICE.

HERMANN ZITZEWITZ, OF CHICAGO, ILLINOIS.

PULLEY-HUB.

SPECIFICATION forming part of Letters Patent No. 302,218, dated July 15, 1884.

Application filed January 30, 1884. (No model.)

*To all whom it may concern:*

Be it known that I, HERMANN ZITZEWITZ, a citizen of the United States of America, residing at Chicago, in the county of Cook and State of Illinois, have invented certain new and useful Improvements in Pulley-Hubs, of which the following is a specification, reference being had therein to the accompanying drawings.

My invention relates to improvements in clamp-hubs for wooden and paper pulleys.

The object of the invention is to obtain a simple and effective hub the parts of which may be readily separated; and to that end the invention consists of the novel devices and combination of devices, as will be described and claimed.

Reference will be made to the accompanying drawings, in which Figure 1 is a front view of the hub complete; Fig. 2, a section of the same; Fig. 3, a perspective of one-half the hub, and Fig. 4 a detail sectional view.

Like letters refer to like parts in each view.

A A represent the upper and lower halves of a board representing the pulley, and B B' the upper and lower halves of the hub. The two halves of the hub are adapted to be slid together and held in position by a dovetail joint, $a$, as shown. With each half of the hub there is cast a semicircular flange, $b$, which are adapted to fit closely against one side of the pulley to form a circular disk. To the opposite side of the pulley are secured semicircular plates $c$, which together form a circular disk on that side of the pulley. Cast upon the flange $b$, which is cast with the lower half of the hub, are two bosses, $d$, which, when the parts are in position, overlap the edges of the remaining flange, while bosses $e$ are cast with the semicircular plate, which is secured to the upper half of the pulley and overlap the edges of the remaining plate.

When the parts are placed in proper position, bolts $f$ are passed through each flange $b$, the pulley, and the opposite plate, or vice versa, and bolts $g$ are passed through the bosses $d$ $e$, to help hold the parts together, and the parts adapted to be readily taken apart.

$h$ represents a suitable screw for keying the hub to the shaft.

What I claim is—

1. A two-part hub provided with a dovetail joint, in combination with a pulley and means for holding the parts in place, as described.

2. A two-part hub provided with a dovetail joint and with semicircular flanges, in combination with a pulley provided with semicircular plates, as described and shown.

3. A two-part hub provided with a dovetail joint and with semicircular flanges, and in combination with a pulley provided with semicircular plates, one flange and one plate provided with overlapping bosses, as described and shown.

In testimony whereof I affix my signature in presence of two witnesses.

HERMANN ZITZEWITZ.

Witnesses:
WM. J. CLAGETT,
LOUIS NOLTING.